S. L. KNEASS.
VALVE.
APPLICATION FILED NOV. 19, 1913.

1,111,391.

Patented Sept. 22, 1914.

WITNESSES:
Rob't R Kitchel.
E. E. Thrall

INVENTOR
Strickland L. Kneass
BY Frank S. Busser
ATTORNEY.

THE NORRIS PETERS CO., PHOTO-LITHO., WASHINGTON, D. C.

UNITED STATES PATENT OFFICE.

STRICKLAND L. KNEASS, OF PHILADELPHIA, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

VALVE.

1,111,391.  Specification of Letters Patent.  Patented Sept. 22, 1914.

Application filed November 19, 1913. Serial No. 801,772.

*To all whom it may concern:*

Be it known that I, STRICKLAND L. KNEASS, a citizen of the United States, residing at Philadelphia, county of Philadelphia, and State of Pennsylvania, have invented a new and useful Improvement in Valves, of which the following is a full, clear, and exact description, reference being had to the accompanying drawings, which form a part of this specification.

For the regulation and control of a moving fluid it is necessary to have an obstructing device which is under the control of the operator and this is usually accomplished by a valve body or casing in the pipe or conduit provided with means for closing, or regulating the size of, a passageway therein. When the attrition of the moving fluid or material held in suspension by it causes rapid or undue wear of the regulating or closing means, it is advantageous that such parts may be easily and individually replaced. It is also an advantage if the operating stem of the closing valve, seating upon the opening in the body or casing, be separate and provided with connecting means permitting a certain amount of motion between the parts to permit accurate and close contact between the removable valve and its seat, independent of the accuracy of alinement of the parts. It is also advisable, and even necessary under certain conditions, for the safety of the operator and to insure the continuous operation of the device or machine for which the fluid is supplied, that there be no risk of the separation of the valve and its stem in service and that replacement after service wear should be inexpensive; it is a further advantage and an element of safety if they cannot be removed by accident or ordinary means, yet possess flexibility of seating when there be a loss of alinement between the operating stem and the valve seat.

The objects of my invention are to provide a valve for the regulation and control of fluid pressure with an operating stem securely but not rigidly connected; to attach the valve to its stem so that it cannot become separated from its stem in service and is under such condition unremovable; and to relieve the strain upon the connecting means during the operation of closing the valve and when pressure is exerted to force or hold the valve on its seat.

A preferred embodiment of my invention is shown in the accompanying drawings, in which—

Figure 1:
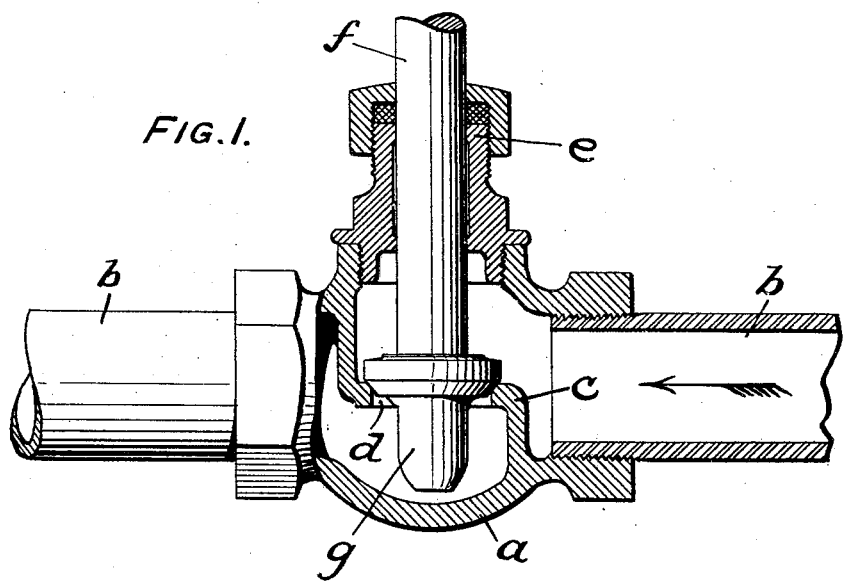
Figure 2:
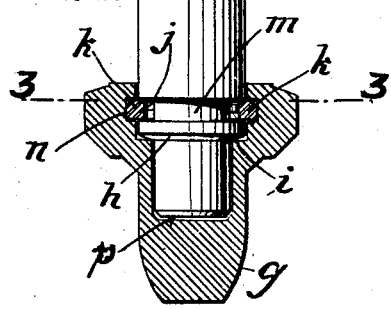
Figure 3:
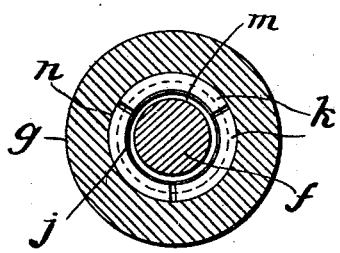
Figure 4:
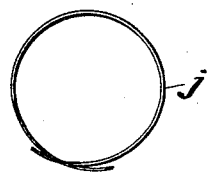

Figure 1 is a view partly in elevation and partly in section, of the valve and valve stem applied to a valve casing interposed in a fluid passageway. Fig. 2 is a similar view of the valve and valve stem, with the valve and the connections between it and its stem shown in section. Fig. 3 is a section on the line 3—3 of Fig. 2. Fig. 4 is a plan view of the spring forming one of the elements of the connections between the valve and stem.

A typical valve casing $a$ is connected at opposite open ends with pipe sections $b$ and is divided, as usual, by a web $c$ having an opening $d$ in which the valve is seated. The valve stem $f$ is shown as extending through a stuffing box $e$ secured in the usual manner to the valve casing. The valve $g$ has an enlarged head, the lower part of whose outside periphery is beveled, as usual, to adapt it to the valve seat. The valve stem $f$ is contracted at its lower end, and this contracted end, as well as a short length of that part of the stem of normal diameter above the contracted end, extends into a correspondingly shaped orifice in the valve. The length of the contracted end of the valve stem $f$ and the location of the shoulder $h$ relative to corresponding internal dimensions of the valve $g$ are such that when the valve stem $f$ forces the valve $g$ to its seat $c$, there is end contact at $p$ between the stem and the valve; or, between the taper shoulder $h$ on the body of the stem and the shoulder $i$ between the enlarged and contracted parts of the orifice in the valve $g$; the effect of these two constructions, similar in principle varying only in method of application, is to relieve all strain upon the segments $k$, hereafter described.

Formed in the inside wall of the head of the valve and in the immediately opposite outside wall of the part of the stem of greater diameter are annular grooves $m$ and $n$ adapted for the reception of a plurality of segments $k$. As shown, these segments are three in number. Their total length, measured along their outer faces, is approximately equal to the circumference of the stem. Their thickness between inner and outer faces is somewhat less than the depth of the groove in the stem. Extending around the valve stem between the base of the groove and the segments *k* is a thin spring *j*. When the segments *k*, backed by the spring *m*, are forced to the fullest extent into the groove in the valve stem, their outer faces are flush or nearly so with the outer face of the stem; permitting the valve to be slipped onto the end of its stem. As soon as the stem is seated in the valve so that the grooves in valve and stem register, the spring *j* forces out the segments *k* in a radial direction and causes their outer portions to extend into the groove *n* in the valve. The larger and smaller diameters of the valve stem are slightly less than the corresponding diameters of the orifice in the valve, and the grooves in the valve and the stem are of the same width but slightly wider than the width of the contained segments; whereby the valve is loosely journaled, permitting a limited amount of movement between the valve and its stem to insure proper contact between the valve and its seat independent of the accuracy of alinement between the valve stem and the valve seat.

The springs are not indispensable, especially when, as is usually the case, the spindle, as applied in service, is approximately horizontal; gravity retaining at least one segment in the proper position. Three segments add to the strength.

It is obvious that there exists no danger, in service, of the separation of the valve and its stem, and that the stem cannot be removed from the valve by accident or by ordinary means, and that replacement after wear is inexpensive.

The invention is particularly applicable to stem valve spindles for injectors, but is also applicable to valves in general.

Having now fully described my invention, what I claim and desire to protect by Letters Patent is:

1. An operating valve comprising a valve stem having a contracted end and provided in the part thereof of greater diameter with an annular external groove, a valve head or valve proper having a cavity, the wider part of which is adapted to the part of the valve stem of greater diameter and the narrower part of which is adapted to receive the contracted end of the valve stem, there being an annular internal groove in the wall of the wider part of said cavity registering with the groove in the valve stem, and inelastic segments loose within the grooves rendering the stem unremovable, there being end contact between the stem and the valve head adapted to relieve the strain upon the segments.

2. An operating valve comprising a valve head or valve proper having an enlarged part adapted to its seat and a contracted part extending beyond its enlarged part and provided with a cavity the entering part of which is of uniform diameter adapted to receive the valve stem, there being an external groove in the valve stem and registering therewith an internal groove in the wall of the entering part of said cavity, inelastic segments loose within the grooves rendering the stem unremovable, there being end contact between the stem and the valve head adapted to relieve the strain upon the segments.

In testimony of which invention, I have hereunto set my hand, at Philadelphia, on this 15th day of November, 1913.

STRICKLAND L. KNEASS.

Witnesses:
M. M. HAMILTON,
E. E. WALL.